United States Patent [19]
Seo

[11] Patent Number: 6,092,729
[45] Date of Patent: Jul. 25, 2000

[54] TWO-DIMENSIONAL DATA SYMBOL PROCESSING SYSTEM

[75] Inventor: Shuzo Seo, Saitama-ken, Japan

[73] Assignee: Asahi Kogaku Kogyo Kabushiki Kaisha, Tokyo, Japan

[21] Appl. No.: 09/012,735

[22] Filed: Jan. 23, 1998

[30] Foreign Application Priority Data

Jan. 24, 1997 [JP] Japan .................................. 9-025837

[51] Int. Cl.⁷ .................................................. G06K 7/10
[52] U.S. Cl. .................... 235/462.09; 235/462.1
[58] Field of Search ................ 235/462.01, 462.09, 235/462.1, 432, 494, 472.01, 462.45

[56] References Cited

U.S. PATENT DOCUMENTS

| | | | |
|---|---|---|---|
| 5,489,158 | 2/1996 | Wang et al. | 400/103 |
| 5,880,453 | 3/1999 | Wang et al. | 235/462.01 |

*Primary Examiner*—Thien M. Le
*Attorney, Agent, or Firm*—Greenblum & Bernstein, P.L.C.

[57] ABSTRACT

A first and a second two-dimensional data symbols are printed on a prepaid card. Once the prepaid card is used repeatedly and an operational parameter data of the prepaid card reaches "0", a hole is pierced in the second two-dimensional data symbol. It is determined that the prepaid card is redundant, when the hole is pierced in the second two-dimensional data symbol.

23 Claims, 3 Drawing Sheets

TWO-DIMENSIONAL DATA SYMBOL PROCESSING SYSTEM

BACKGROUND OF THE INVENTION

1. Field of the Invention

The present invention relates to an information processing system using a two-dimensional data symbol.

2. Description of the Related Art

Conventionally, there is known a prepaid card system, such as a telephone card. In the prepaid card system, various information is magnetically recorded in a magnetic recording area of a card, in accordance with the operational parameter data contained in the prepaid card, and the information in the magnetic recording area is read by a card reader when the card is used, by which the operational parameter data of the card is determined and, if necessary, revised. If the operational parameter data exceeds the operational parameters of the card, namely, the card has reached "0" units, the card becomes redundant.

However, since it is a simple process to magnetically record information in the magnetic recording area, the data contained in the magnetic recording area can be easily counterfeited, enabling the previously redundant card to be reused illegally.

SUMMARY OF THE INVENTION

Therefore, an object of the present invention is to provide an information processing system, and also an information recording medium, using a two-dimensional data symbol, which remains accurately detectable even if the magnetically recorded data has been counterfeited.

In accordance with an aspect of the present invention, there is provided a two-dimensional data symbol processing system comprising: an information recording medium provided with two-dimensional data symbols; an information controller which adds new information to the information recording medium by erasing at least one portion of the two-dimensional data symbols; and a symbol reader which reads the two-dimensional data symbols. A predetermined operation is performed on the information recording medium, in accordance with the new information, when the new information is received, by the symbol reader from the two-dimensional data symbols.

A predetermined operation is performed on the information recording medium, when the two-dimensional data symbols can not be read by the symbol reader. Further, a predetermined operation is also performed on the information recording medium, when a data other than a data initially stored in the two-dimensional data symbols is read by the symbol reader.

The information recording medium is a prepaid card. The information controller is a punch. A predetermined operation determines an operational parameter data of the prepaid card. A predetermined operation determines whether or not the prepaid card is redundant. A predetermined operation also determines whether or not an operational parameter data of the prepaid card is outside an operational parameter of the prepaid card.

In accordance with another aspect of the present invention, there is provided a two-dimensional data symbol processing system comprising: a prepaid card, on which first and second two-dimensional data symbols are printed, and which has a magnetic recording area; and a card checker which has a two-dimensional data symbol reader, a magnetic head, and a punch. The two-dimensional data symbol reader reads the first and second two-dimensional data symbols. The magnetic head records data in and reads data from the magnetic recording area. The punch pierces a hole in the first and second two-dimensional data symbols so that the first and second two-dimensional data symbols can not be read by the two-dimensional data symbol reader. A predetermined operation is performed on the prepaid card, when either the first or second two-dimensional data symbol can not be read by the two-dimensional data symbol reader. When the first two-dimensional data symbol can not be read by the two-dimensional data symbol reader, an operational parameter data of the prepaid card is determined, and when the second two-dimensional data symbol can not be read by the two-dimensional symbol data reader, it is determined that the operational parameter data is outside an operational parameter data of the prepaid card.

Further, in accordance with another aspect of the present invention, there is provided a two-dimensional data symbol processing system comprising: an information recording medium, provided with two-dimensional data symbols, which has a magnetic recording area; an information controller which adds new information to the information recording medium by erasing at least one portion of the two-dimensional data symbols; and a symbol reader which reads the two-dimensional data symbols. A predetermined operation is performed on the two-dimensional data symbols in accordance with the data recorded in the magnetic recording area.

Furthermore, in accordance with another aspect of the present invention, there is provided an information recording medium comprising: a magnetic recording area, in which various information can be recorded or read from; an indication area which displays an operational parameter data of the information recording medium, and a two-dimensional data area in which two-dimensional data symbols are formed. New information is added to the information recording medium by erasing at least one portion of the two-dimensional data symbols. The two-dimensional data area is formed adjacent to the indication area. The two-dimensional data area is formed beneath the indication area.

BRIEF DESCRIPTION OF THE DRAWINGS

The present invention will be better understood from the description of the preferred embodiment of the invention set forth below, together with the accompanying drawings, in which.

DESCRIPTION OF THE PREFERRED EMBODIMENTS

Figure 1:
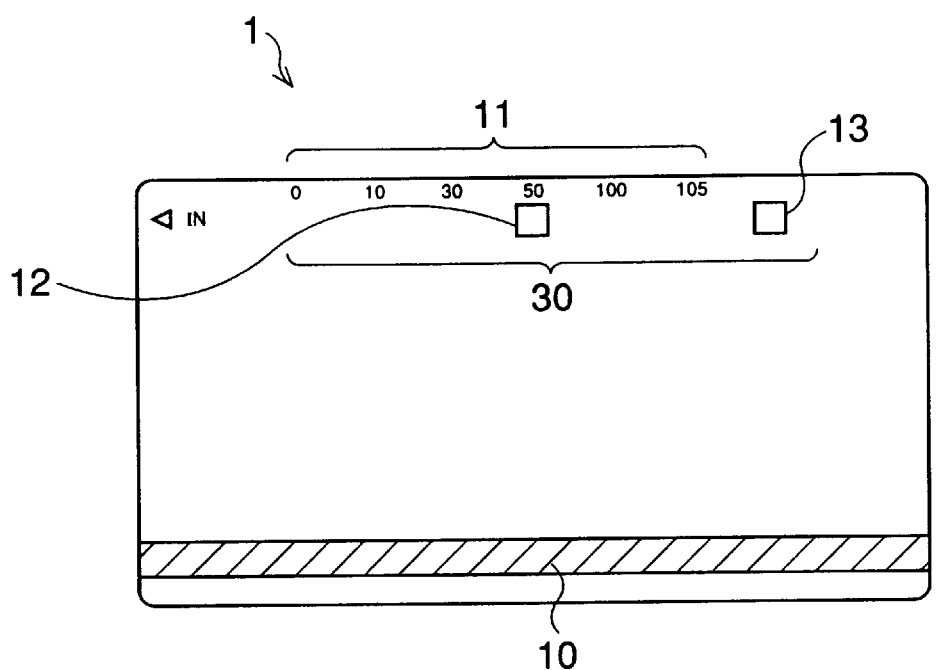
FIG. 1 is a front view of a prepaid card.

The present invention will now be described, with reference to the embodiment shown in the drawings.

FIG. 1 shows a prepaid card, which has not previously been used, to which the present invention is applied.

A magnetic recording area 10 is provided along the lower side of the prepaid card 1. The magnetic recording area 10, in which various information, such as the operational parameter data, is recorded in or is read from, is conventionally well-known. An indication area 11 is provided along the upper side of the prepaid card 1. The indication area 11, exhibiting a printed gauge, displays the operational parameter data of the prepaid card 1. Beneath the gauge of the indication area 11, a hole can be pierced in accordance with the operational parameter data, by which a user can distinguish the remaining number of units available on the prepaid card 1.

Further, beneath the indication area 11, a two-dimensional data area 30 is provided. In the two-dimensional data area 30, first and second two-dimensional information patterns 12 and 13 are printed. In the two-dimensional data area 30, the first two-dimensional information pattern 12 is printed under the numeral "50". The first two-dimensional information pattern 12 is used to determine whether or not the operational parameter data exceeds "50" units. In the two-dimensional data area 30, the second two-dimensional information pattern 13 is printed at a position close to the right side of the indication area 11. The second two-dimensional information pattern 13 is used to determine whether or not the prepaid card 1 exists within its operational parameters.

Figure 2:
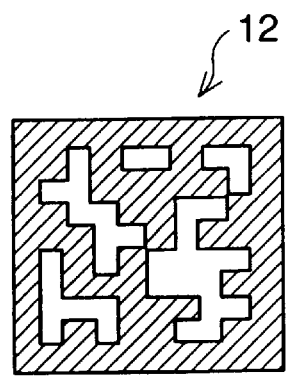
FIG. 2 is a front view of a two-dimensional information pattern.

FIG. 2 shows the first two-dimensional information pattern 12 printed on the prepaid card 1. The first two-dimensional information pattern 12 may measure 2.5 millimeter square. In the first two-dimensional information pattern 12, black zones and white zones are two-dimensionally arranged to represent a coded data. Namely, the first two-dimensional information pattern 12 is a tessellated pattern. The tessellated pattern is formed by arranging 100 cell pieces, which measure 0.25 millimeter square, in such a manner that the cells conform to a 10*10 matrix. Note that the first two-dimensional information pattern 12 and the second two-dimensional information pattern 13, having comparable features, undergo a conventional error correcting process, which, being well-known in the field, is not discussed herein.

Figure 3:
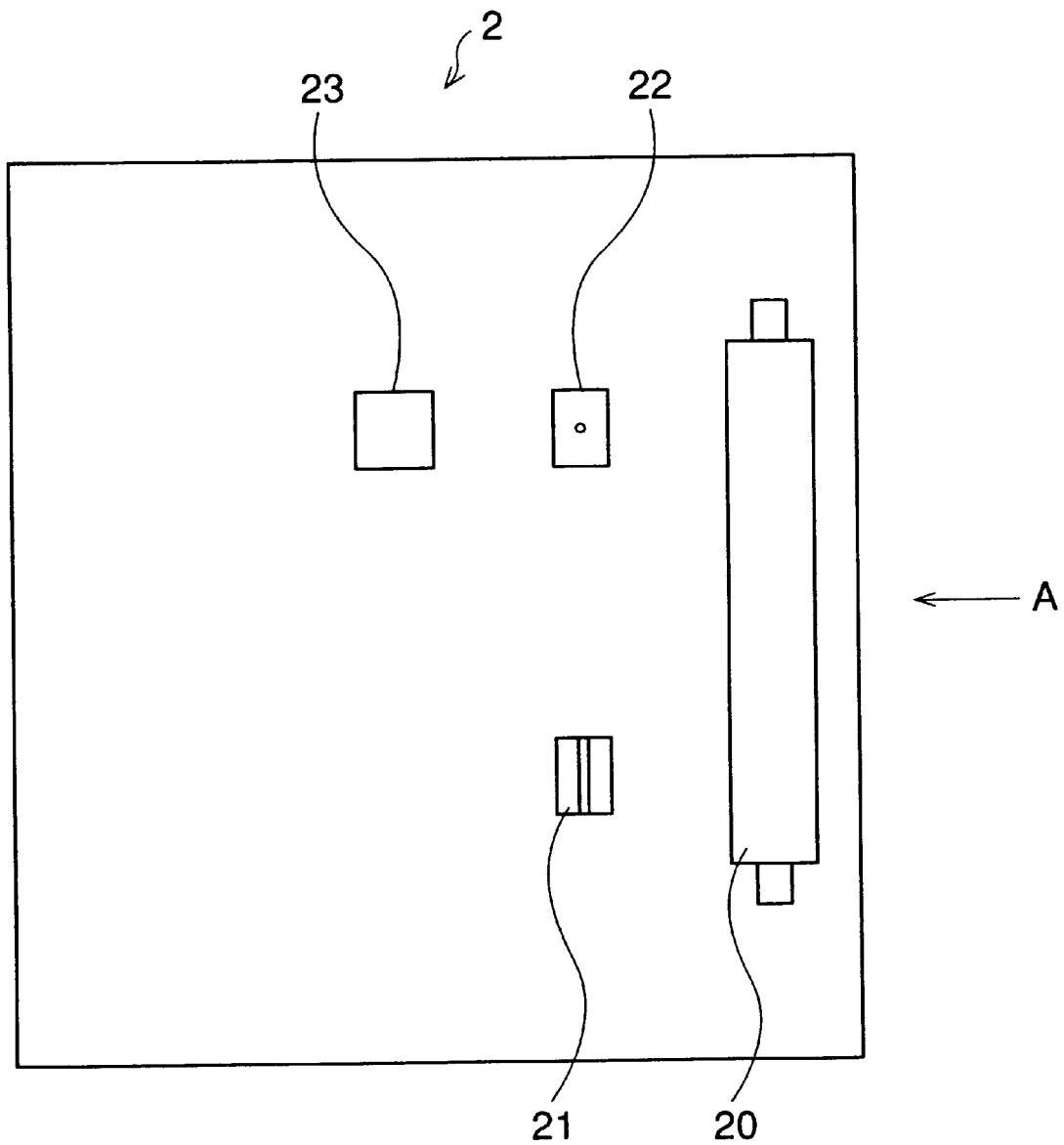
FIG. 3 is a schematic view of a card checker.

FIG. 3 is a schematic representation of a card checker, provided in a machine such as a telephone, into which the prepaid card 1 is inserted.

A roller 20 is provided in the card checker 2, which assists insertion and ejection of the prepaid card 1 into or out of the card checker 2. The roller 20 is placed close to a card insertion slot (not shown). Further, the card checker 2 comprises a magnetic head 21, a punch 22 and a two-dimensional information pattern reader 23. The magnetic head 21 reads out the data recorded in the magnetic recording area 10 of the prepaid card 1, and records various data in the magnetic recording area 10. A hole is pierced in the first and second two-dimensional information patterns 12 and 13 by the punch 22. The first and second two-dimensional information patterns 12 and 13 are read by the two-dimensional information pattern reader 23.

The magnetic head 21 is disposed so as to be parallel to the path of the magnetic recording area 10 when the prepaid card 1 is inserted into the card checker 2. The punch 22 and the two-dimensional information pattern reader 23 are placed so as to be parallel to the paths of the first and second two-dimensional information patterns 12 and 13 when the prepaid card 1 is inserted into the card checker 2.

Further, the card checker 2 comprises a system control circuit (not shown). The system control circuit outputs predetermined controlling signals in accordance with data read by the magnetic head 21 and the two-dimensional information pattern reader 23. For example, when the data shows that the prepaid card 1 is a redundant (i.e, disposable) card, the system control circuit outputs a signal to a roller driving circuit (not shown) which drives the roller 20, by which the prepaid card 1 is ejected from the card checker 2.

When the prepaid card 1 is inserted from the direction A, being led by the roller 20, the data recorded in the magnetic recording area 10 is read by the magnetic head 21, and the second two-dimensional information pattern 13 is read by the two-dimensional information pattern reader 23. If the prepaid card 1 has not yet been used, the data, which shows that the prepaid card 1 is new, is recorded in the magnetic recording area 10, and also, the second two-dimensional information pattern 13 can be read by the two-dimensional information pattern reader 23, as confirmation. Accordingly, the system control circuit determines that the prepaid card 1 is within the operational parameters, and can thus be utilized.

After the prepaid card 1 has been used repeatedly, and the operational parameter data reaches "50" units, predetermined information is recorded in the magnetic recording area 10 by the magnetic head 21, and a hole, which may have a diameter of one millimeter, is pierced under the numeral "50", at the position on which the first two-dimensional information pattern 12 is printed, by the punch 22.

Figure 4:
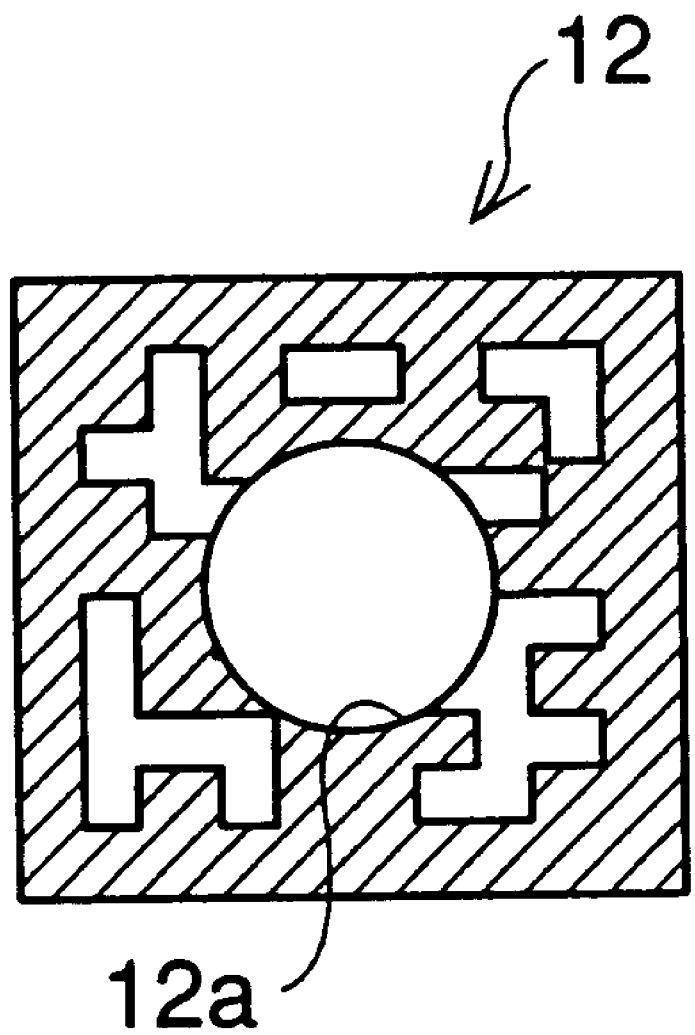
FIG. 4 is a front view of the two-dimensional information pattern through which a hole is pierced.

FIG. 4 shows the first two-dimensional information pattern 12 in which a hole is pierced. The first two-dimensional information pattern 12 is printed on the prepaid card 1 in such a manner that a punch hole 12a can be pierced in the center. As described above, the first two-dimensional information pattern 12 has a structure consisting of 100 cell pieces, measuring 0.25 millimeter square, being arranged as a uniform square 10*10 matrix of side 2.5 millimeters, such that a tessellated pattern is formed. Accordingly, approximately 9 to 12 cells are deleted by the piercing of the hole 12a, if the diameter of the hole 12a is one millimeter. The two-dimensional information pattern 12 thus becomes unreadable in a system which supports 10 percent error correction.

After the prepaid card 1 is used further, and then the operational parameter data reaches "0" units, information, which indicates that the prepaid card 1 has exceeded an operational parameter and is thus redundant, is recorded in the magnetic recording area 10 by the magnetic head 21, and a hole, which may have a diameter of one millimeter, is pierced at the position on which the two-dimensional information pattern 13 is printed, by the punch 22.

If the prepaid card 1, the operational parameter data of which has reached "0", is inserted into the card checker 2, the information recorded in the magnetic recording area 10, which indicates that the prepaid card 1 is redundant, is read by the magnetic head 21, and transmitted to the system control circuit. Further, the signal, which indicates that the second two-dimensional information pattern 13 can not be read by the two-dimensional information pattern reader 23, is also transmitted to the system control circuit. The system control circuit subsequently outputs the control signal which rejects the prepaid card 1. Accordingly, a user cannot utilize a redundant prepaid card 1.

The first and second two-dimensional information patterns 12 and 13 are formed on the prepaid card 1 by printing. Namely, the prepaid card, utilized to the system, can be easily manufactured.

Further, in this embodiment, the usage history of the prepaid card 1 is managed by both the magnetic recording area 10 and the first and second two-dimensional information patterns 12 and 13. Accordingly, even if the data recorded in the magnetic recording area 10 is changed illegally, by the inclusion of data indicating that the prepaid card exists within its operational parameters, after the actual operational parameter data has reached "0" units, the second two-dimensional information pattern 13, in which the hole is pierced, can not be read by the two-dimensional information pattern reader 23, thereby enabling the system control circuit to determine that the prepaid card 1 is redundant. Accordingly, the illegal use of the prepaid card 1 is prevented.

Furthermore, in this embodiment, when the operational parameter data reaches "50" units, the punch hole 12a is pierced in the first two-dimensional information pattern 12, so that the first two-dimensional information pattern 12 can not be read by the two-dimensional information pattern reader 23, and the information, which indicates that the operational parameter data is "50" units, is transmitted to the system control circuit.

Accordingly, if the information, read from the magnetic recording area 10, indicates that the operational parameter data is more than "50" units, the system control circuit can determine that the information is incorrect. Namely, the magnetic recording area 10 can be checked for falsification even before the operational parameter data reaches "0" units.

In this embodiment, two-dimensional information patterns are printed at two positions on the prepaid card, however, the number and printed locations of the two-dimensional information patterns, on the prepaid card, may vary with necessity.

Further, in this embodiment, one hole is pierced in the center of a two-dimensional information pattern, however, the hole may be pierced at any location on the prepaid card, so that the two-dimensional information pattern can not be read by the two-dimensional information pattern reader. A plurality of holes, having uniform or varying diameters, may also be pierced.

Furthermore, in this embodiment, the hole is pierced in the two-dimensional information pattern by the punch, however, the hole may be pierced by a laser beam. Also, indelible ink may be jetted on the two-dimensional information pattern to color or to print any pattern on the two-dimensional information pattern. Namely, any means, by which the two-dimensional information pattern may be rendered unreadable by the two-dimensional information pattern reader, may be applied to the system. Specifically, the indelible ink, used for rendering the two-dimensional information pattern unreadable, enables the prepaid card to be collected intact, after the operational parameter data reaches "0" units. Further, both the ink for printing the two-dimensional information pattern and the ink for being jetted on the two-dimensional information pattern, may be a type of transparent ink, so that the surface of the prepaid card remains unmarred.

Note that, in this embodiment, the prepaid card 1 is a telephone card and the card checker 2 is a telephone, however, the prepaid card 1 and the card checker 2 may be used in other systems, such as traffic facilities, in which a prepaid card having a magnetic recording area is employed.

Note also, that the two-dimensional information patterns may be located on the reverse of the surface on which the indication area 11, which displays the operational parameter data of the prepaid card 1, is formed. Namely, the two-dimensional information pattern may be formed on either the top surface or the bottom surface of the prepaid card.

In addition, although the embodiments described herein are directed to values of "50" and "0", the invention is not so limited. Rather, any values can be utilized. Additionally, any number of information patterns may be utilized to represent any corresponding number of values.

As described above, according to the present invention, even if the magnetic data of the prepaid card is counterfeited, the illegal use of the prepaid card is still prevented.

The present disclosure relates to subject matter contained in Japanese Patent Application No.09-025837 (filed on Jan. 24, 1997) which is expressly incorporated herein, by reference, in its entirety.

What is claimed is:

1. A two-dimensional data symbol processing system comprising:
    an information recording medium provided with two-dimensional data symbols;
    an information controller which adds new information to said information recording medium by erasing at least one portion of said two-dimensional data symbols; and
    a symbol reader which reads said two-dimensional data symbols;
    wherein a predetermined operation is performed on said information recording medium in accordance with said new information, when said new information is received from said two-dimensional data symbols by said symbol reader.

2. A two-dimensional data symbol processing system according to claim 1, wherein said predetermined operation is performed on said information recording medium, when said two-dimensional data symbols can not be read by said symbol reader.

3. A two-dimensional data symbol processing system according to claim 1, wherein said predetermined operation is performed on said information recording medium, when a data other than a data initially stored in said two-dimensional data symbols is read by said symbol reader.

4. A two-dimensional data symbol processing system according to claim 1, wherein said information recording medium is a prepaid card.

5. A two-dimensional data symbol processing system according to claim 4, wherein said information controller is a punch.

6. A two-dimensional data symbol processing system according to claim 5, wherein said predetermined operation determines an operational parameter data of said prepaid card.

7. A two-dimensional data symbol processing system according to claim 5, wherein said predetermined operation determines whether or not said prepaid card is redundant.

8. A two-dimensional data symbol processing system according to claim 5, wherein said predetermined operation determines whether or not an operational parameter data of said prepaid card is outside an operational parameter of said prepaid card.

9. A two-dimensional data symbol processing system comprising:
    a prepaid card on which a first two-dimensional data symbol and a second two-dimensional data symbol are printed, and which has a magnetic recording area; and
    a card checker which has a two-dimensional data symbol reader, a magnetic head, and a punch, said two-dimensional data symbol reader reading said first two-dimensional data symbol and said second two-dimensional data symbol;
    wherein a predetermined operation is performed on said prepaid card, when said first two-dimensional data symbol or said second two-dimensional data symbol can not be read by said two-dimensional data symbol reader.

10. A two-dimensional data symbol processing system according to claim 9, wherein said magnetic head records data in and reads data from said magnetic recording area, and said punch pierces a hole in said first two-dimensional data symbol and said second two-dimensional data symbol so that said first two-dimensional data symbol and said second two-dimensional data symbol can not be read by said two-dimensional data symbol reader.

11. A two-dimensional data symbol processing system according to claim 10, wherein, when said first two-dimensional data symbol can not be read by said two-dimensional data symbol reader, an operational parameter data of said prepaid card is determined, and, when said second two-dimensional information symbol can not be read by said two-dimensional data symbol reader, it is determined that said operational parameter data is outside an operational parameter of said prepaid card.

12. A two-dimensional data symbol processing system comprising:
  an information recording medium, provided with two-dimensional data symbols, which has a magnetic recording area;
  an information controller which adds new information to said information recording medium by erasing at least one portion of said two-dimensional data symbols; and
  a symbol reader which reads said two-dimensional data symbols;
  wherein a predetermined operation is performed on said two-dimensional data symbols in accordance with the data recorded in said magnetic recording area.

13. An information recording medium comprising:
  a magnetic recording area in which various information is recorded in or is read from;
  an indication area which displays an operational parameter data of said information recording medium; and
  a two-dimensional data area distinct from said indication area in which two-dimensional data symbols are formed.

14. An information recording medium according to claim 13, wherein new information is added to said information recording medium by erasing at least one portion of said two-dimensional data symbols.

15. An information recording medium according to claim 13, wherein said two-dimensional data area is formed adjacent to said indication data area.

16. An information recording medium according to claim 15, wherein said two-dimensional data area is formed beneath said indication data area.

17. A two-dimensional data symbol processing system comprising:
  means for recording information on which two-dimensional data symbols are formed;
  means for adding new information to said recording information means by erasing at least one portion of said two-dimensional data symbols;
  means for reading said two-dimensional data symbols; and
  means for performing a predetermined operation to said recording information means when said new information is received from said two-dimensional data symbols by said reading means.

18. An object representing a variable value, comprising:
  a first information recording medium provided with two-dimensional data symbols;
  a second information recording medium capable of magnetically storing information;
  first and second information readers capable of reading said first and second information recording mediums, respectively;
  an information controller that updates said first information recording medium by removing at least a portion of said two-dimensional data symbols; and
  a comparator that compares data from said first and second recording mediums, as read by said first and second information readers;
  wherein a predetermined operation occurs if data from said first recording medium is inconsistent with said data from said second recording medium.

19. The object of claim 18, wherein said information controller comprises a disfiguring device that is capable of altering at least a portion of said two-dimensional data symbols such that it cannot be read by said first information reader.

20. The object of claim 19, wherein said disfiguring device is a hole punch.

21. The object of claim 18, wherein said disfiguring device is an ink marker.

22. The system of claim 1, wherein said information controller erases only a portion of said two-dimensional data symbols.

23. The system of claim 17, wherein said means for adding erases only a portion of said two-dimensional data symbols.

* * * * *